Sept. 13, 1966  W. H. ROYER  3,272,155
OVEN HEATING SYSTEM
Filed Sept. 18, 1963  4 Sheets-Sheet 2

INVENTOR.
WAYNE H. ROYER
BY
Otto Moeller
Attorney

Sept. 13, 1966　　　　　W. H. ROYER　　　　　3,272,155
OVEN HEATING SYSTEM
Filed Sept. 18, 1963　　　　　　　　　　　4 Sheets-Sheet 3

INVENTOR.
WAYNE H. ROYER
BY
Otto Moeller
Attorney

Sept. 13, 1966 W. H. ROYER 3,272,155
OVEN HEATING SYSTEM
Filed Sept. 18, 1963 4 Sheets-Sheet 4

INVENTOR.
WAYNE H. ROYER
BY
*Otto Moeller*
Attorney

United States Patent Office 3,272,155
Patented Sept. 13, 1966

3,272,155
OVEN HEATING SYSTEM
Wayne H. Royer, York, Pa., assignor to Read Corporation, York, Pa., a corporation of Delaware
Filed Sept. 18, 1963, Ser. No. 309,814
15 Claims. (Cl. 107—55)

This invention relates to commercial baking ovens of the type including an endless tray conveyor for conducting the products to be baked along an upper run from the front to the rear of the oven and along a lower run back to the front of the oven, and more particularly to an air circulating system therefor.

Various systems of air circulation and agitation have been employed in the past for improving the baking characteristics of such ovens. However, such systems have not embodied the desired flexibility for selectively controlling the air circulation pattern or volume along the upper run of the products with respect to the lower run thereof to meet varying production and baking characteristic requirements. It is an object of the present invention to provide a novel oven and air circulating system therefor, providing a greater degree of flexibility in selectively controlling the baking conditions along the upper and lower runs of the products through the oven to effect more efficient baking, to meet required baking conditions for a variety of products and to facilitate obtaining certain characteristics in the baked products, such as a desired degree of top coloring.

A further object is to provide in an oven of the type described, upper and lower baking chambers individual to the respective upper and lower runs of the products to be baked, and an air circulating and agitating system individual to each baking chamber.

Additionally, it is an object to provide an individual air circulating system in each of such individual upper and lower baking chambers wherein the air is caused to flow between upper and lower plenum chambers in each baking chamber uniformly across the extent of such chambers.

A still further object is to provide damper controlled duct means in such individual circulating systems for selectively controlling the relative amounts of air circulated through the upper and lower baking chambers.

Still another object is to provide novel duct and damper means whereby circulation of air in the lower baking chamber may be simply and conveniently reversed downwardly or upwardly therethrough by simple manipulation of certain dampers, to meet baking requirements of various types of foodstuffs.

Other objects and advantages of the invention will be apparent from the following description taken in connection with the accompanying drawings, in which.

Figure 1:
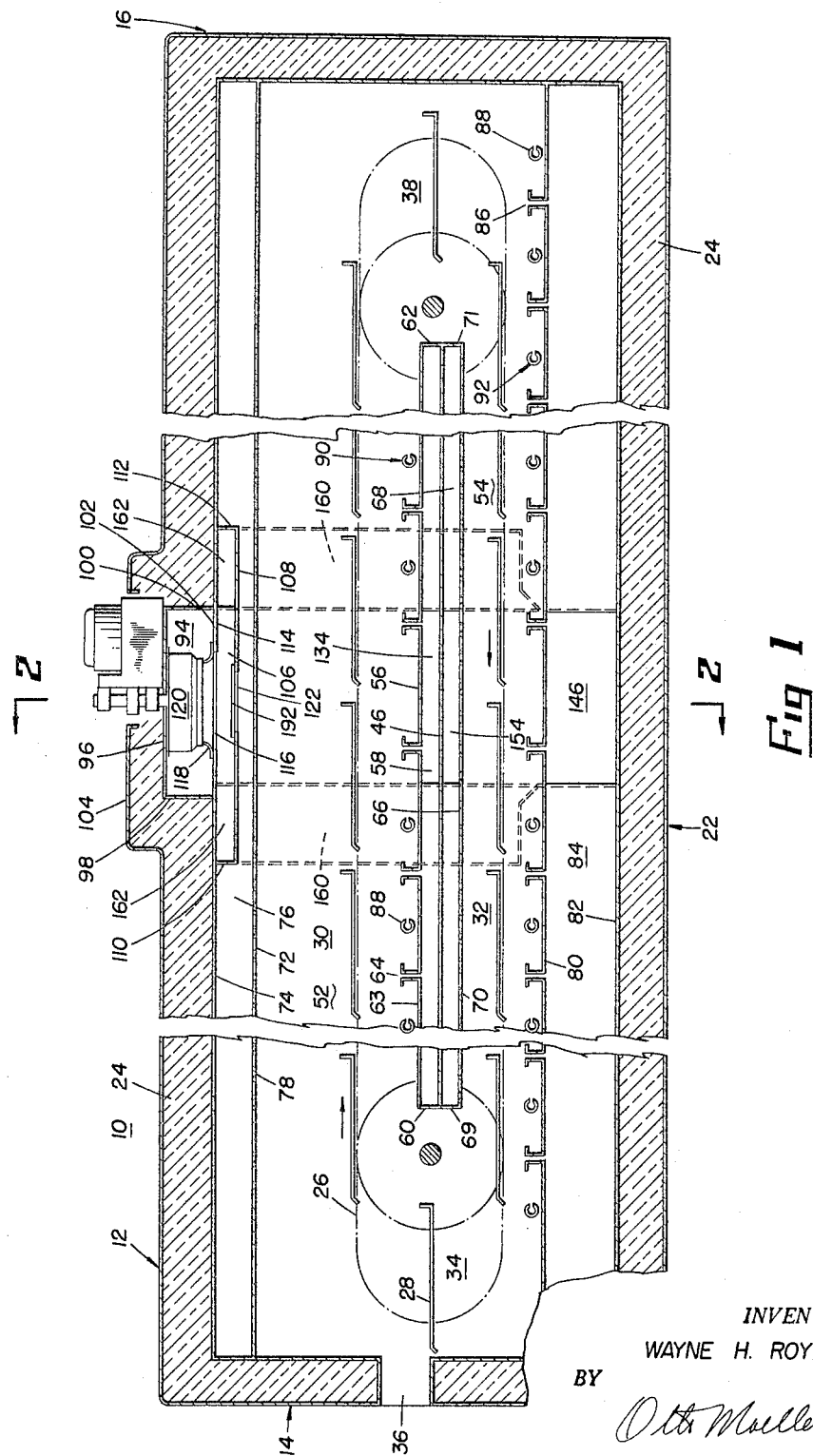
FIGURE 1 is a longitudinal vertical section through a direct fired baking oven embodying the present invention, parts being shown in elevation.

The oven 10, illustrated in the drawings, is of generally rectangular shape, having a top wall 12, front wall 14, rear wall 16, side walls 18 and 20, and a base 22, which walls are made up of spaced inner and outer plates, between which plates is interposed suitable heat insulating material designated by reference numeral 24.

The oven 10 is of the type commonly referred to as a single lap tray type oven. In other words, an endless tray conveyor 26, traveling in the direction of the arrows, conveys the trays 28 in a longitudinally extending upper run 30 from the front to the rear of the oven and in a longitudinally extending lower run 32 from the rear to the front of the oven. The trays 28 are elevated from the lower run 32 to the upper run 30 along an ascending run 34 adjacent an opening 36 in the front wall of the oven, and are lowered from upper run 30 to lower run 32 along a descending run 38 adjacent the rear wall of the oven.

The tray conveyor 26, illustrated rather diagrammatically in FIGURE 1, may be of any suitable form well known in the art, and includes endless chains 40 and 42, one at each side of the oven. The chains 40 and 42 define the aforementioned runs of the tray conveyor 26, and at the turns from one run to the other are trained over suitable sprockets and guide shoes in a manner well known in the art. Supported between the chains 40 and 42 are a multiplicity of transversely extending equidistantly spaced trays 28, a representative few of which are shown in FIGURE 1. Suitable means is provided for maintaining the trays 28 in horizontal position as they are conveyed through the oven; and since such stabilizing means does not constitute a part of the present invention, it has not been shown in the drawings.

A horizontal imperforate partition 46 disposed approximately midway between the upper and lower runs 30 and 32 of the tray conveyor 26, extends laterally from inner shell 48 of oven side wall 18 to inner shell 50 of oven side wall 20, and longitudinally from adjacent the ascending run 34 of tray conveyor 26 to adjacent the descending run 38 of tray conveyor 26, dividing the oven into an upper baking chamber 52 and a lower baking chamber 54. A horizontal perforated partition 56, coextensive with partition 46 and spaced thereabove, forms therebetween a shallow plenum chamber 58, closed at its forward and rearward ends by end closures 60 and 62. As shown, the perforated partition 56 is preferably formed of a plurality of transversely extending plates 63 longitudinally spaced apart to form therebetween vents or slots 64, distributed substantially uniformly over the area of the partition 56, providing communication between plenum chamber 58 and upper baking chamber 52. A horizontal partition 66, coextensive with partition 46 and spaced therebelow, forms therebetween a shallow plenum chamber 68, closed at its forward and rearward ends by end closures 69 and 71. Horizontal partition 66 is provided with a plurality of apertures 70 distributed substantially uniformly over the extent thereof, providing communication between the plenum chamber 68 and lower baking chamber 54. If desired, the partition 66 can be formed in the same manner as partition 56 providing slots or vents in place of the apertures 70.

A horizontal partition 72, disposed below the inner shell 74 of the oven top wall 12 extends substantially the width of the interior of the oven and preferably, as shown, extends substantially the length thereof. Actually, the partition 72 may terminate short of the ends of the oven without materially affecting the efficient functioning of my improved oven, being dictated in some instances by interfering accessories or appurtenances. The partition 72 forms with the inner shell 74 of the oven top wall 12, a shallow plenum chamber 76 in upper baking chamber 52. Partition 72 is provided with a plurality of apertures 78 distributed substantially evenly over the extent thereof providing communication between plenum chamber 76 and upper baking chamber 52. If desired, the partition 72 can be formed in the same manner as partition 56 providing slots or vents in place of the apertures 78.

A horizontal perforated partition 80 disposed above the inner shell 82 of the oven base 22 extends substantially the width of the interior of the oven and preferably, as shown, extends substantially the length thereof. As in the case of the partition 72, the partition may terminate somewhat short of the ends of the oven without materially affecting the efficient functioning of my improved oven, being dictated in some instances by interfering accessories or appurtenances. The partition 80 forms with the inner shell 82 of the oven base 22, a shallow plenum chamber 84. As shown, the perforated partition 80 is preferably formed of a plurality of transversely extending plates longitudinally spaced apart to form therebetween vents or slots 86, distributed substantially uniformly over the area of the partition 80, providing communication between the plenum chamber 84 and lower baking chamber 54.

The pans of dough to be baked are loaded at the opening 36 onto successive trays 28, which are preferably of suitable grille type. The trays are transported through the upper baking chamber 52 by the tray conveyor 26 along upper run 30, disposed approximately midway between the plenum chambers 58 and 76, and are transported through the lower baking chamber 54 along the lower run 32 of the tray conveyor 26, disposed approximately midway between the plenum chambers 68 and 84.

The baking chambers 52 and 54 are heated to the desired baking temperatures by a plurality of transversely extending longitudinally spaced fluid fuel burners 88, which may be of any suitable conventional type and are therefore not shown or described in detail. The heating system includes an upper series 90 of such burners 88 disposed between the plenum chamber 58 and the upper run 30 of the conveyor 26, and a lower series 92 of such burners 88 disposed between the plenum chamber 84 and the lower run 32 of the tray conveyor 26.

Referring now to the improved air circulating system, the term air being used in a generic sense to include the oven atmosphere as well as the products of combustion from the burners 88, there is provided in the oven top wall 12 an open ended elongated duct or discharge header 94 extending transversely between oven side walls 18 and 20, and disposed approximately midway between the front and rear of the oven. The header 94 includes a top wall 96, front and rear walls 98 and 100, and the bottom wall 102 which may conveniently be formed as part of the inner shell 74 of the oven top wall 12. The top wall 96 of the header 94 is disposed in spaced relation below the outer shell 104 of the oven top wall 12 to provide space therebetween for insulation 24.

Subjacent the discharge header 94 and extending transversely between oven side walls 18 and 20 is a shallow duct or collecting header 106. Header 106 extends through the plenum chamber 76, and includes a bottom wall 108 spaced above the partition 72 that forms the bottom wall of plenum chamber 76; front and rear walls 110 and 112; and the top wall 114 which is conveniently formed as part of the inner shell 74 of the oven top wall 12 and the bottom wall 102 of discharge header 94. As best shown in FIGURE 1, the collecting header 106 extends a distance forward and a distance rearward of discharge header 94.

The bottom wall 102 of the discharge header 94 is provided with a centrally disposed circular opening 116 which is embraced by the inlet ring 118 of a blower 120 located in the discharge header 94. The bottom wall 108 of the collecting header 106 is provided with a circular opening 122 in registering relation with respect to opening 116 whereby air is withdrawn by the blower 120 from both the collecting header 106 and the plenum chamber 76.

Figure 2:
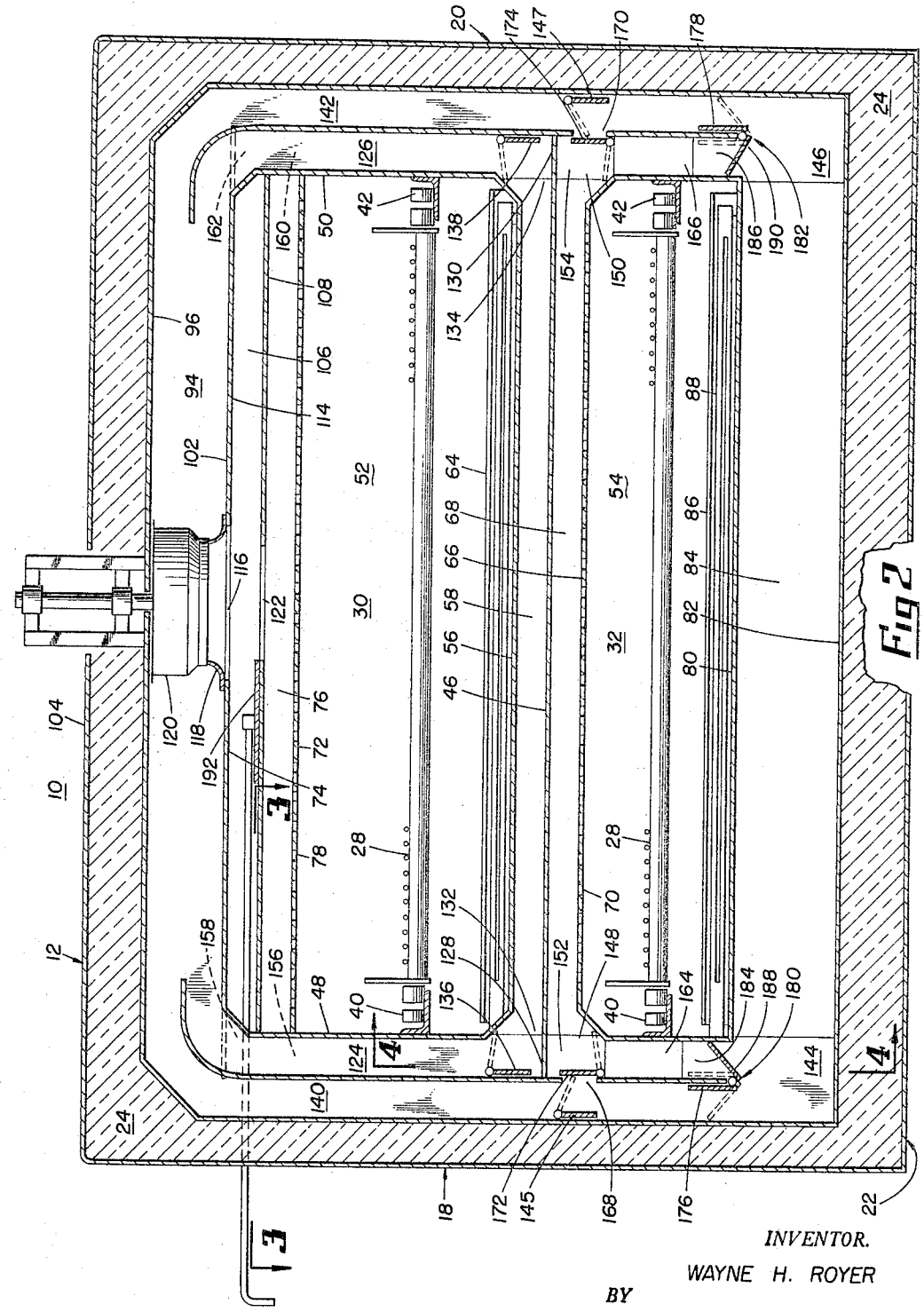
FIGURE 2 is a sectional view taken on the line 2—2 of FIGURE 1.
Figure 3:
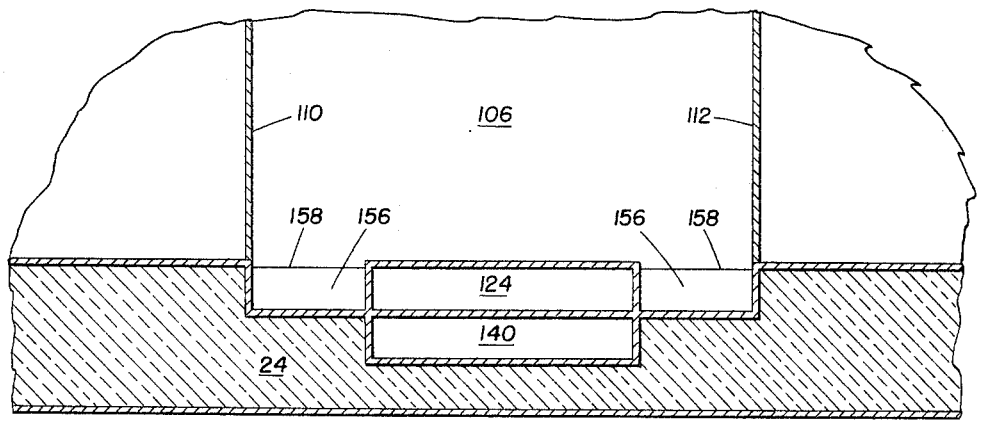
FIGURE 3 is a sectional view taken on the line 3—3 of FIGURE 2.

As best shown in FIGURES 2 and 3, a pair of vertical inner blowing or discharge ducts 124 and 126 disposed within the oven side walls 18 and 20 adjacent their inner shells 48 and 50 communicate at their upper ends with the lower half of the open ends of the transversely extending discharge header 94. Bottom end walls 128 and 130 coplanar with the oven partition 46 form bottom end closures for the vertical ducts 124 and 126. Openings 132 and 134 in the innermost side walls of the vertical ducts 124 and 126 adjacent bottom end walls 128 and 130 provide communication with lower plenum chamber 58 of the upper baking chamber 52. It will be seen that air from the discharge of the blower 120 flows laterally therefrom in opposite directions through the transverse discharge header 94, then downwardly through vertical ducts 124 and 126 and then through openings 132 and 134 into opposite sides of the plenum chamber 58. The relation of the area of the apertures 64 in top wall 56 of plenum chamber 58 with respect to the area of the apertures 78 in bottom wall 72 of the plenum chamber 76 is preferably such as to build up a pressure in plenum chamber 58, whereby to insure a continuous upward evenly distributed flow of air throughout the upper baking chamber 52 from the plenum chamber 58 to the plenum chamber 76. From plenum chamber 76, the air is withdrawn through openings 122 and 116 to the intake of the blower 120. Dampers 136 and 138 are hingedly mounted in the lower portion of the ducts 124 and 126 are are adapted for adjustment from outside the oven to any one of a number of positions between their full line and broken line positions, as shown in FIGURE 2, to control the amount of air circulated through the upper baking chamber 52. The particular means for mounting and adjusting the dampers 136 and 138, as well as the other hinged dampers hereinafter referred to, does not constitute a part of the present invention. Such means may be of any suitable type, well known in the art, and has not been shown in the drawings.

Also within oven side walls 18 and 20, contiguous with and laterally outward of ducts 124 and 126, are a pair of laterally outer vertical blowing or discharge ducts 140 and 142 arranged to communicate at their upper ends with the upper half of the open ends of the transversely extending discharge header 94, and arranged at their lower ends to communicate with the lower plenum chamber 84 of the lower baking chamber 54 through inwardly directed ducts or passages 144 and 146, whereby air from the discharge side of blower 120 is introduced into plenum chamber 84.

Dampers 145 and 147, hingedly mounted in the ducts 140 and 142, are movable from outside the oven to any one of a number of adjusted positions between their full line and broken line positions, as shown in FIGURE 2, to control the amount of air circulated through the lower baking chamber 54.

Figure 4:
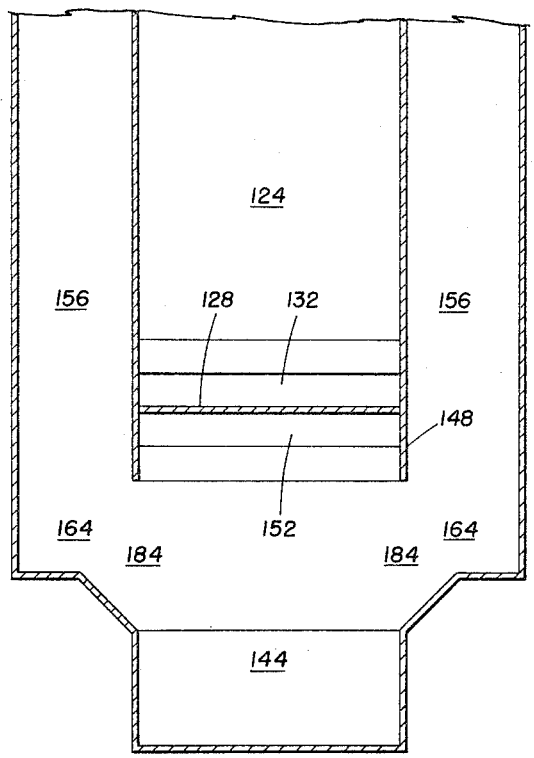
FIGURE 4 is a sectional view taken on the line 4—4 of FIGURE 2.

From plenum chamber 68, the air is returned to collecting header 106, by duct means to be described, for withdrawal through opening 116 to the intake side of the blower 120. This duct means includes abbreviated ducts 148 and 150 which, in effect, form downwardly extending continuations of the ducts 124 and 126 but are closed off therefrom by the previously described walls 128 and 130. The abbreviated ducts 148 and 150 communicate with plenum chamber 68 through inner side openings shown at 152 and 154. Extending along opposite sides of the ducts 124, 148 are a pair of vertical ducts 156 which, at their upper ends, communicate with collecting header 106 through openings 158, as best shown in FIGURE 3. Similarly, along opposite sides of ducts 126, 150 are a pair of similar vertical ducts 160 which, at their upper ends, communicate with collecting header 106 through openings 162, as best shown in FIGURE 1. The open lower ends of the ducts 156 and abbreviated duct 148 open into a common duct section 164, as best shown in FIGURE 4, and similarly the open lower ends of ducts 160 and abbreviated duct 150, at the opposite side of the oven, open into a common duct section 166.

The described duct means thus provides for passage of the air from plenum chamber 68 through openings 152 and 154 into abbreviated ducts 148 and 150, then into common ducts 164 and 166, from whence it flows upwardly through vertical ducts 156 and 160, through openings 158 and 162 into collecting header 106.

Through the means described above, there is provided an air circulating system individual to the upper and lower baking chambers 52 and 54, and in which by means of the dampers 136, 138 and 145, 147 the relative amounts of air circulated through the baking chambers 52 and 54 may be easily controlled.

It is frequently desirable to provide more top heat on the products being baked as they are transported along the lower run 32 of the tray conveyor 26. For this purpose, the air circulating system of my improved oven provides means for selectively blowing the air upwardly or downwardly through the lower baking chamber 54 independently of the circulation through the upper baking chamber 52.

To accomplish this, the abbreviated ducts 148 and 150 are provided in their walls common to the blowing ducts 140 and 142, with openings shown at 168 and 170, which openings are controlled by hingedly mounted dampers 172 and 174, arranged to be operated, in well known manner, from outside the oven. When blowing air upwardly through the lower baking chamber 54, as described above, the dampers 172 and 174 are disposed in their full line positions, as shown in FIGURE 2, whereby to close the openings 168 and 170. When it is desired to reverse the flow of air through the lower baking chamber 54, dampers 172 and 174 are moved to their broken line positions, in which positions they effect opening of openings 168 and 170 and closing of the open lower ends of the abbreviated ducts 148 and 150, whereby air from blowing ducts 140 and 142 flows through openings 168 and 170, into abbreviated ducts 148 and 150 and then through openings 152 and 154 into plenum chamber 68. In order to prevent the air in blowing ducts 140 and 142 from entering the lower plenum chamber 84, the lower ends of the blowing ducts 140 and 142, where they communicate with passages 144 and 146, are provided with blades 176 and 178 of hingedly mounted double dampers 180 and 182. By moving dampers 180 and 182 from their full line to their broken line positions, as shown in FIGURE 2, the blades 176 and 178 close the lower ends of the blowing ducts 140 and 142.

Air from the plenum chamber 68 blows downwardly through lower baking chamber 54 into plenum chamber 84, from which it is arranged to return to collecting header 106 by the means now to be described. Connecting ducts 184 and 186 communicate at their upper ends with the common ducts 164 and 166, and communicate at their lower ends with the passages 144 and 146, as best shown in FIGURES 2 and 4. Now, with the double dampers 180 and 182 in their broken line positions, blades 188 and 190 effect opening of the open lower ends of connecting ducts 184 and 186, whereby air from the plenum chamber 84 flows into passages 144 and 146, thence into connecting ducts 184 and 186, then into common ducts 164 and 166, and then through vertical return ducts 156 and 158 to the collecting header 106.

Thus, by proper manipulation of the dampers, air can selectively be blown downwardly through lower baking chamber 54 from plenum chamber 68 to plenum chamber 84 or upwardly through lower baking chamber 54 from plenum chamber 84 to plenum chamber 68, and in either case the relative amount of air flowing through the upper and lower baking chambers may be selectively controlled.

While a single air circulating system is shown and has been described, it will be understood that for ovens of a considerable length two or more such air circulating systems, one adjacent the other longitudinally of the oven, may be employed, each with its individual blower, duct means, plenum chambers and dampers.

A damper 192, operable from outside the oven, is provided for controlling the opening 122, so that if it is desider for any reason to interrupt the flow of air through the upper baking chamber 52 by closing the dampers 136 and 138, the damper 122 may be closed to prevent withdrawing of air from the upper baking chamber by the blower 120. This is of particular importance where a number of air circulating systems are employed in the oven so that, for example, if the front section of the oven it is desired to blow steam on the product, the dampers 136, 138 and 192 of the circulating system in the front section of the oven can be closed independently of the remaining circulating systems.

Figure 5:
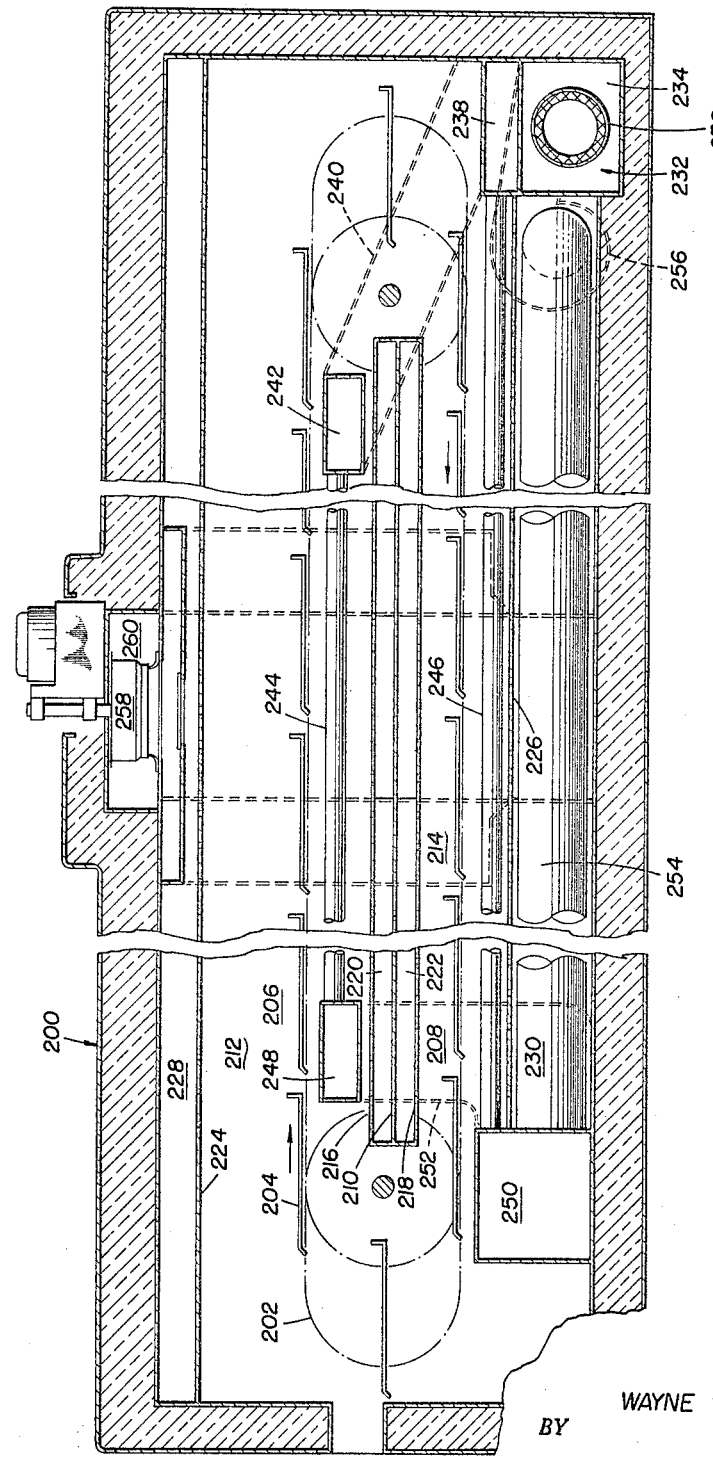
FIGURE 5 is a longitudinal vertical section through a modified type of oven embodying the present invention, parts being shown in elevation.

Referring to FIGURE 5, the invention is shown as applied to an indirect fired oven 200 similar in all respects, unless otherwise noted, to the above described oven 10. As in the first described form of the invention, an endless tray conveyor 202 conveys the trays 204 in a longitudinally extending upper run 206 from the front to the rear of the oven and in a longitudinally extending lower run 208 from the rear to the front of the oven.

An imperforate partition 210 between upper and lower runs 206 and 208 divide the oven into an upper baking chamber 212 and a lower baking chamber 214, and perforated partitions 216 and 218, respectively disposed above and below the imperforate partition 210, form therewith shallow plenum chambers 220 and 222, in all respects the same as in the first described form of the invention. A perforated partition 224 spaced below the top of the oven and a perforated partition 226 spaced above the base of the oven form therewith shallow plenum chambers 228 and 230, respectively disposed in the upper portion of upper baking chamber 212 and the lower portion of lower baking chamber 214. In the present instance, the perforated partition 226 and its associated plenum chamber 230 terminates short of the forward and rearward ends of the oven, to accommodate the indirect heating system, hereinafter described.

The heating unit 232 includes a mixing chamber 234 disposed within and extending transversely of the lower rearward portion of the oven. Mounted within and in spaced relation to the walls of the mixing chamber 234 is a tubular burner housing 236 with which is associated, in conventional manner, a suitable burner, not shown, adapted to burn liquid fuel or gas, as desired.

The hot products of combustion enter a lower rear header 238 extending transversely across the width of the oven below the lower run 208 of the tray conveyor 202 and above the level of the lower partition 226. Extending upwardly and forwardly from the opposite ends of the header 238, are ducts 240 disposed in the side walls of the opposite sides of the oven. The upper ends of the ducts 240 communicates with the opposite ends of an upper rear header 242 which extends transversely across the width of the oven and is disposed between and in spaced relation with respect to the upper run 206 of the tray conveyor 202 and the lower plenum chamber 220 of upper baking chamber 212.

Within the upper and lower baking chambers 212 and 214, communicating with and extending toward the front of the oven from the headers 242 and 238, are upper and lower banks 244 and 246 of transversely spaced apart flues. The upper bank of flues 244 is disposed between the upper run 206 of tray conveyor 202 and lower plenum chamber 220 of upper baking chamber 212, while the lower bank of flues 246 is disposed between the lower run 208 of tray conveyor 202 and lower plenum chamber 230 of lower baking chamber 214. At their forward ends the banks of flues 244 and 246 communicate respectively with upper front header 248 and lower front header 250. The headers 248 and 250 extend transversely the width of the oven and are connected by ducts 252, disposed in the opposite side walls of the oven.

A return flue 254 communicates with the lower portion of header 250 and extends rearwardly therefrom centrally through the plenum chamber 230 to the suction side of a blower 256. The discharge side of the blower 256 is connected with the heater mixing chamber 234, whereby the hot products of combustion are recirculated. While not shown, it is understood that a damper regulated stack is disposed between the blower 256 and the mixing chamber 234, in conventional manner, to vent a desired proportion of the combustion gases after having passed through the heating system.

Means, including a blower 258 and damper controlled ducts, is provided for recirculating the baking chamber atmosphere. This means is the same in all respects as the means particularly described above and shown in FIGURES 1, 2, 3 and 4, so that it is not further described in detail to avoid needless repetition. As in the first form of the invention the discharge side of the blower 258 communicates with a transversely extending discharge header 260. From discharge header 260, the atmosphere is introduced into opposite ends of the lower plenum chamber 220 of upper baking chamber 212 through damper controlled ducts, such as the blowing ducts 124 and 126 of FIGURE 2. The atmosphere is withdrawn through upper plenum chamber 228 and re-introduced to the suction side of blower 258 in the same manner as described and shown in the first form of the invention. A portion of the atmosphere from discharge header 260 is introduced into opposite ends of the lower plenum chamber 230 of the lower baking chamber 214 through damper controlled ducts, such as the blowing ducts 140 and 142 of FIGURE 2. The atmosphere is withdrawn through upper plenum chamber 222 and re-introduced to the suction side of blower 258 in the same manner as described and shown in the first form of the invention. Means such as shown in FIGURES 2 and 4 and described above relative to the first form of the invention is provided for reversing the flow of atmosphere through the lower baking chamber 214 from plenum chamber 222 to plenum chamber 230.

It will be apparent from the above that an improved air circulating and agitating system is provided and that is adapted to both an indirect and a direct fired oven, affording the baker a great latitude of choice in controlling the air circulating system whereby various types of products may be baked under the most desirable conditions.

While the invention has been described with particular reference to a single lap oven, it will be understood that the invention is applicable to an upper and lower tray conveyor run of a double lap oven.

I claim:
1. In an air circulating system for an oven provided with an endless traveling tray conveyor for transporting products to be baked therethrough in an upper and a lower longitudinally extending run,
   an imperforate horizontal partition between said upper and lower tray conveyor runs extending from one side of the other of the oven to provide therein an upper and a lower baking chamber,
   perforate horizontal partitions above and below said upper tray conveyor run providing in said upper baking chamber an upper and a lower plenum chamber,
   perforate horizontal partitions above and below said lower tray conveyor run providing in said lower baking chamber an upper and a lower plenum chamber,
   a blower,
   first blowing duct means communicating with the discharge side of said blower and the lower plenum chamber of said upper baking chamber,
   means providing communication between the intake side of said blower and the upper plenum chamber of said upper baking chamber,
   second blowing duct means communicating with the discharge side of said blower,
   intake duct means communicating with the intake side of said blower,
   and damper controlled connecting duct means selectively providing communication between either of said second blowing or intake duct means with one or the other of said upper or lower plenum chambers of said lower baking chamber.

2. An air circulating system for an oven as set forth in claim 1 including heating means between the upper run of said tray conveyor and the lower plenum chamber of said upper baking chamber, and between the lower run of said tray conveyor and the lower plenum chamber of said lower baking chamber.

3. In a heating and air circulating system for an oven provided with an endless traveling tray conveyor for transporting products to be baked therethrough in an upper and a lower longitudinally extending run,
   an imperforate horizontal partition between said upper and lower tray conveyor runs extending from one side to the other of the oven to provide therein an upper and a lower baking chamber,
   perforate horizontal partitions above and below said upper tray conveyor run providing in said upper baking chamber an upper and a lower plenum chamber.
   perforate horizontal partitions above and below said lower tray conveyor run providing in said lower baking chamber an upper and a lower plenum chamber,
   heating means between the upper run of said tray conveyor and the lower plenum chamber of said upper baking chamber, and between the lower run of said tray conveyor and the lower plenum chamber of said lower baking chamber,
   a blower,
   first blowing duct means communicating with the discharge side of said blower and the lower plenum chamber of said upper baking chamber,
   means providing communication between the intake side of said blower and the upper plenum chamber of said upper baking chamber,
   second blowing duct means communicating with the discharge side of said blower and the lower plenum chamber of said lower baking chamber, and
   intake duct means communicating with the intake side of said blower and the upper plenum chamber of said lower baking chamber.

4. A heating and air circulating system for an oven as set forth in claim 3, including damper means in said first and second blowing duct means for controlling the relative amounts of air discharged into said upper and lower baking chambers.

5. In an air circulating system for an oven provided with an endless traveling tray conveyor for transporting products to be baked therethrough in an upper and a lower longitudinally extending run,
   an imperforate horizontal partition between said upper and lower tray conveyor runs extending from one side to the other of the oven to provide therein an upper and a lower baking chamber,
   perforate horizontal partitions above and below said upper tray conveyor run extending from one side to the other of the oven providing in said upper baking chamber an upper and a lower plenum chamber,
   perforate horizontal partitions above and below said lower tray conveyor run extending from one side to the other of the oven providing in said lower baking chamber an upper and a lower plenum chamber,
   a blower disposed at the top of said oven,
   a pair of vertical blowing ducts in each oven side wall communicating at their upper ends with the discharge of said blower, one of each of said pairs of blowing ducts communicating at its lower end with a respective side of the lower plenum chamber of said upper baking chamber and the other of each of said pairs of blowing ducts communicating at its lower end with a respective side of the lower plenum chamber of said lower baking chamber, means providing communication between the intake of said blower and the upper plenum chamber of said upper baking chamber, vertical intake duct means in each oven side wall communicating at their upper ends with the intake of said blower and communicating at their lower ends with respective sides of the upper plenum chamber of said lower baking chamber.

6. An air circulating system for an oven as set forth in claim 5 including damper controlled by-pass means in each side wall of the oven associated with the lower portions of the said one of each of said pairs of blowing ducts and said intake ducts to provide communication between said one of each of said pairs of blowing ducts and the upper plenum chamber of said lower baking chamber and between said intake ducts and the lower plenum chamber of said lower baking chamber.

7. In an air circulating system for an oven provided with an endless traveling tray conveyor for transporting products to be baked therethrough in an upper and a lower longitudinally extending run, an imperforate horizontal partition between said upper and lower tray conveyor runs extending from one side to the other of the oven to provide therein an upper and a lower baking chamber, perforate horizontal partitions above and below said upper tray conveyor run providing in said upper baking chamber an upper and a lower plenum chamber, perforate horizontal partitions above and below said lower tray conveyor run providing in said lower baking chamber an upper and a lower plenum chamber, a transversely extending open ended discharge header in the top wall of said oven between the front and rear thereof, a blower having its discharge side in communication with said header, a pair of vertical discharge ducts in each side of said oven communicating at their upper ends with the open ends of said transverse discharge header, the lower ends of one of each of said pairs of discharge ducts communicating respectively with opposite sides of the lower plenum chamber of said upper baking chamber, and the lower ends of the other of each of said pairs of discharge ducts communicating respectively with opposite sides of the lower plenum chamber of said lower baking chamber, a transverse collecting header extending from one side to the other of the oven subjacent said discharge header, a restricted opening providing communication between said collecting header and the upper plenum chamber of said upper baking chamber, vertical duct means in each of the side walls of said oven providing communication between the respective opposite sides of said collecting header and the respective opposite sides of the upper plenum chamber of said lower baking chamber, and means providing communication between said collecting header and the intake side of said blower.

8. In an air circulating system for an oven as set forth in claim 7 including an adjustable damper for said restricted opening to control the flow of air from the upper plenum chamber of said upper baking chamber to the intake side of said blower.

9. In an air circulating system for an oven provided with an endless traveling tray conveyor for transporting products to be baked therethrough in an upper and a lower longitudinally extending run, an imperforate horizontal partition between said upper and lower tray conveyor runs extending from one side to the other of the oven to provide therein an upper and a lower baking chamber, air distributing means in the lower portion of said upper baking chamber beneath the upper run of said tray conveyor and air collecting means in the upper portion of said upper baking chamber above the upper run of said tray conveyor, said air distributing and air collecting means having a pluarlity of apertures distributed thereover from one side to the other of the oven and for the greater length of the upper run of said tray conveyor, air distributing means in the lower portion of said lower baking chamber beneath the lower run of said tray conveyor and air collecting means in the upper portion of said lower baking chamber, said last named air distributing and air collecting means having a plurality of apertures distributed thereover from one side to the other of the oven and for the greater length of the lower run of said tray conveyor, a blower, first blowing duct means communicating with the discharge side of said blower and the air distributing means of said upper baking chamber, means providing communication between the intake side of said blower and the air collecting means of said upper baking chamber, second blowing duct means communicating with the discharge side of said blower and the air distributing means of said lower baking chamber, and intake duct means communicating with the intake side of said blower and the air collecting means of said lower baking chamber.

10. An air circulating system for an oven as set forth in claim 9, including damper means in said first and second blowing duct means for controlling the relative amounts of air discharged into said upper and lower baking chambers.

11. An air circulating system for an oven set forth in claim 9, including heating means between the upper run of said tray conveyor and the air distributing means of said upper baking chamber, and between the lower run of said tray conveyor and the air distributing means of said lower baking chamber.

12. An air circulating system for an oven as set forth in claim 9, including damper controlled duct means connecting said second blowing duct means and said intake duct means for alternatively providing communcation between said second blowing duct means and the air collecting means and said upper baking chamber, and between said intake duct means and the air distributing means of said lower baking chamber, for reversing the direction of flow of air in said lower baking chamber.

13. In an air circulating system for an oven provided with an endless traveling tray conveyor including a pair of vertically spaced upper and lower longitudinally extending runs for transporting products to be baked through said oven, an imperforate horizontal partition between said pair of upper and lower tray conveyor runs extending from one side to the other of the oven to provide therein an upper baking zone for the products on said upper tray conveyor run and a lower baking zone for the products on said lower tray conveyor run, a perforate partition above said imperforate partition forming therewith a plenum chamber in the lower portion of said upper baking zone spaced below said upper tray conveyor run, a perforate partition below said imperforate partition forming therewith a plenum chamber in the upper portion of said lower baking zone spaced above said lower tray conveyor run, blower means, duct means providing communication between one side of said blower means and the plenum chamber in the lower portion of said upper baking zone and duct means providing communication between the opposite side of said blower means and the upper portion of said upper baking zone above said upper tray conveyor run to provide circulation of air through said upper baking zone, and duct means providing communication between one side of said blower means and the plenum chamber in the upper portion of said lower baking zone and duct means providing communication between the opposite side of said blower means and the lower portion of said lower baking zone below said lower tray conveyor run to provide circulation of air through said lower baking zone.

14. An air circulating system for an oven as set forth in claim 13 including heating means between the upper run of said tray conveyor and the plenum chamber in the lower portion of said upper baking zone, and between the lower run of said tray conveyor and the lower portion of said lower baking zone.

15. An air circulating system for an oven as set forth in claim 13 including damper means associated with said duct means for controlling the relative amounts of air circulated through said upper and lower baking zones.

References Cited by the Examiner
UNITED STATES PATENTS

| | | | |
|---|---|---|---|
| 1,878,703 | 9/1932 | Hoppe | 107—57 |
| 2,286,049 | 6/1942 | Baker | 107—55 X |
| 2,783,720 | 3/1957 | Skarin et al. | 107—57 X |

WALTER A. SCHEEL, *Primary Examiner.*

JOSEPH SHEA, *Assistant Examiner.*